C. PFANNE.
Machines for Picking and Twisting Cows' Hair, &c.

No. 154,766. Patented Sept. 8, 1874.

7 Sheets--Sheet 1.

WITNESSES:
Jas. E. Hutchinson
John R. Young

INVENTOR:
Chas. Pfanne, by
Prindle and Deane, his Attys

7 Sheets--Sheet 2.
C. PFANNE.
Machines for Picking and Twisting Cows' Hair, &c.
No. 154,766. Patented Sept. 8, 1874.
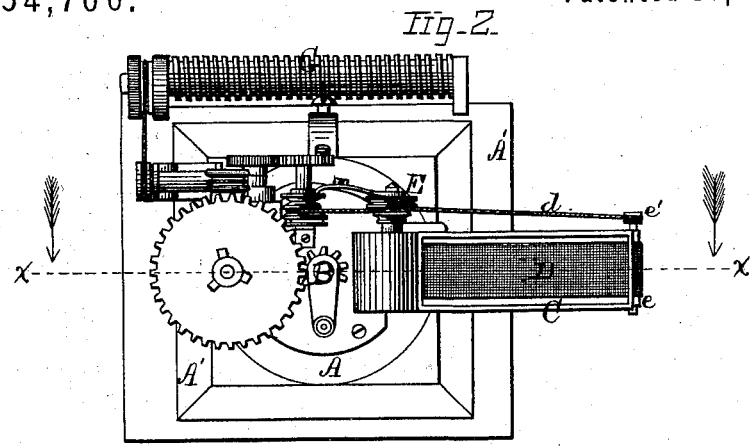
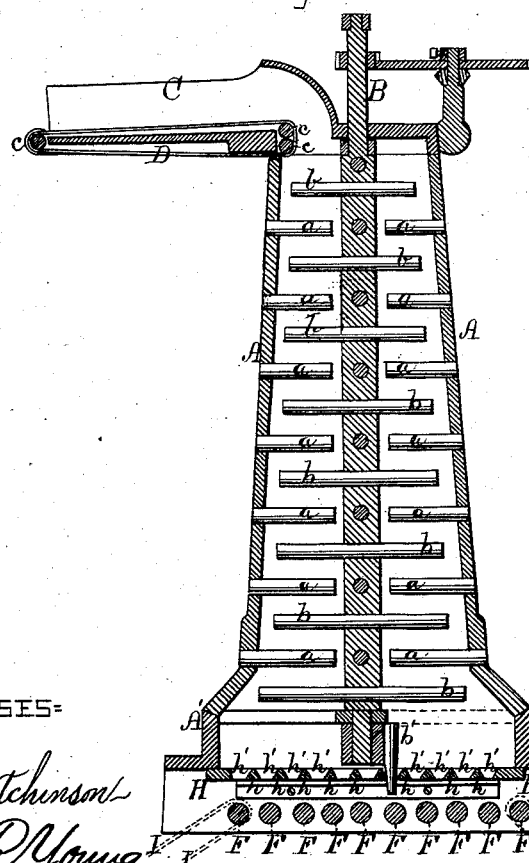

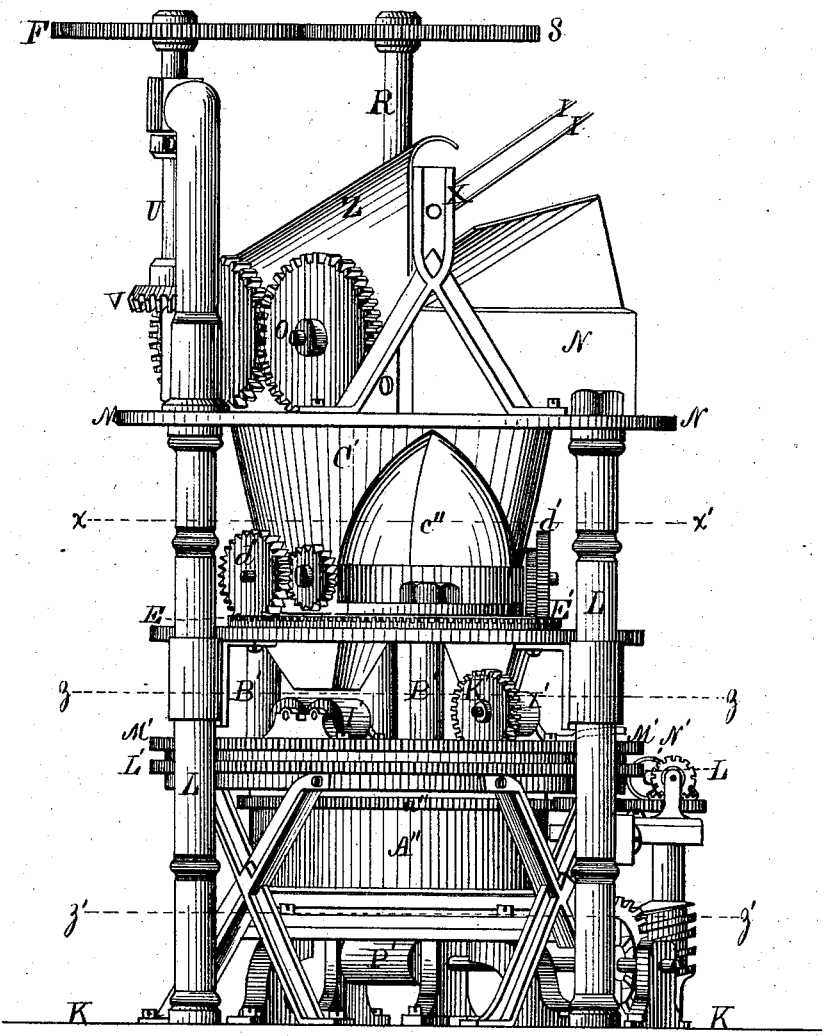

7 Sheets--Sheet 4.

C. PFANNE.
Machines for Picking and Twisting Cows' Hair, &c.

No. 154,766. Patented Sept. 8, 1874.

WITNESSES:
Jas. E. Hutchinson
John R. Young

INVENTOR.
Chas. Pfanne, by
Prindle and Dean, his Attys

7 Sheets--Sheet 5.

C. PFANNE.
Machines for Picking and Twisting Cows' Hair, &c.

No. 154,766. Patented Sept. 8, 1874.

WITNESSES:
Jas. E. Hutchinson
John R. Young

INVENTOR.
Chas. Pfanne, by
Prindle and Dean, his Attys

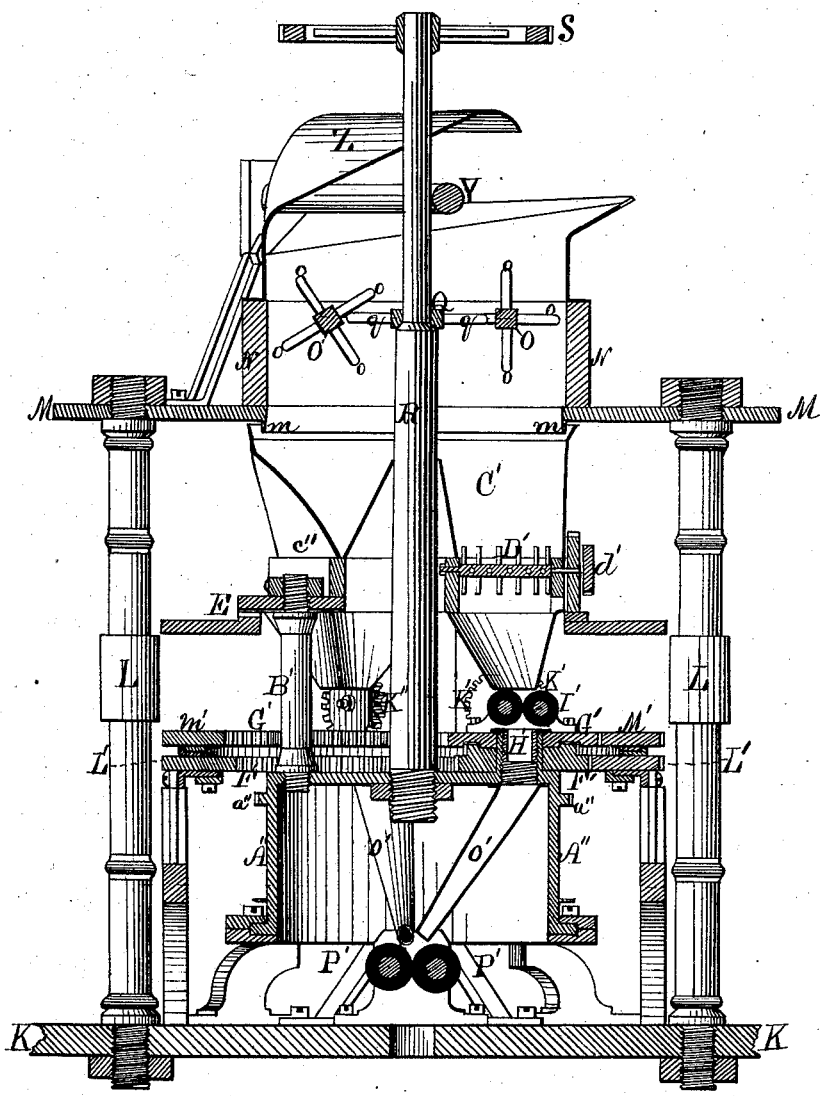

7 Sheets--Sheet 7.
C. PFANNE.
Machines for Picking and Twisting Cows' Hair, &c.
No.154,766. Patented Sept. 8, 1874.
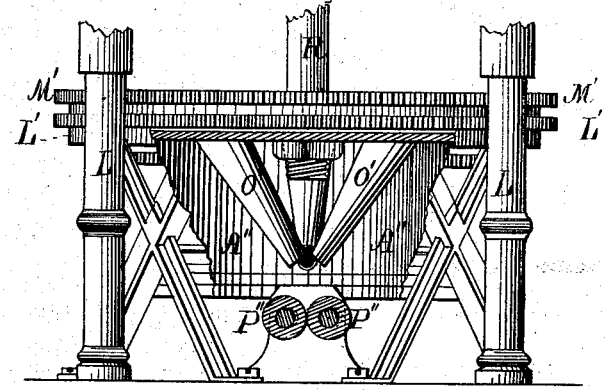
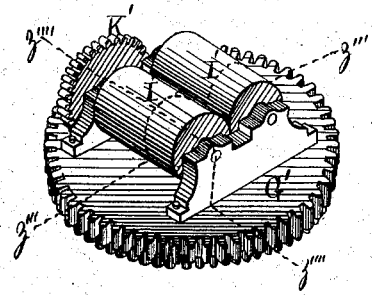
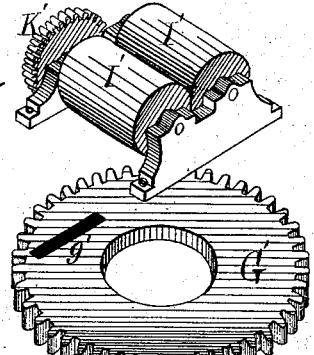
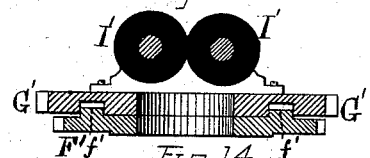
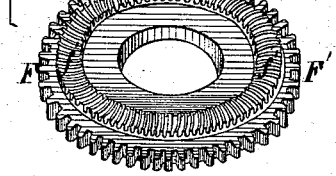
WITNESSES:
Jas. E. Hutchinson
John R. Young
INVENTOR:
Chas. Pfanne, by
Prindle and Deane, his
Attorneys.

UNITED STATES PATENT OFFICE.

CHARLES PFANNE, OF WASHINGTON, DISTRICT OF COLUMBIA.

IMPROVEMENT IN MACHINES FOR PICKING AND TWISTING COW'S HAIR, &c.

Specification forming part of Letters Patent No. 154,766, dated September 8, 1874; application filed May 13, 1874.

*To all whom it may concern:*

Be it known that I, CHARLES PFANNE, of Washington, in the county of Washington, and in the District of Columbia, have invented certain new and useful Apparatus for Spinning Cow's Hair; and do hereby declare that the following is a full, clear, and exact description thereof, reference being had to the accompanying drawings, making a part of this specification, in which—

Figure 1:
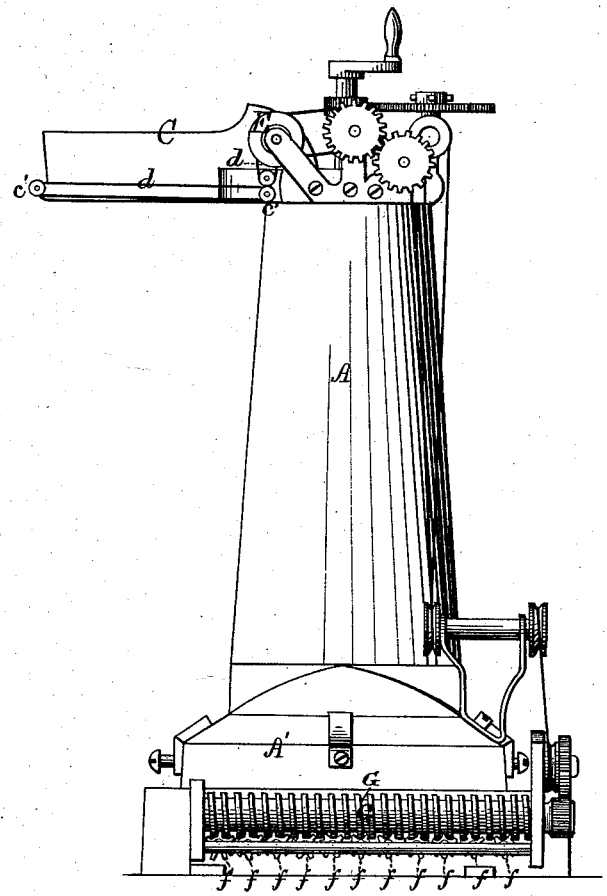
Figure 5:
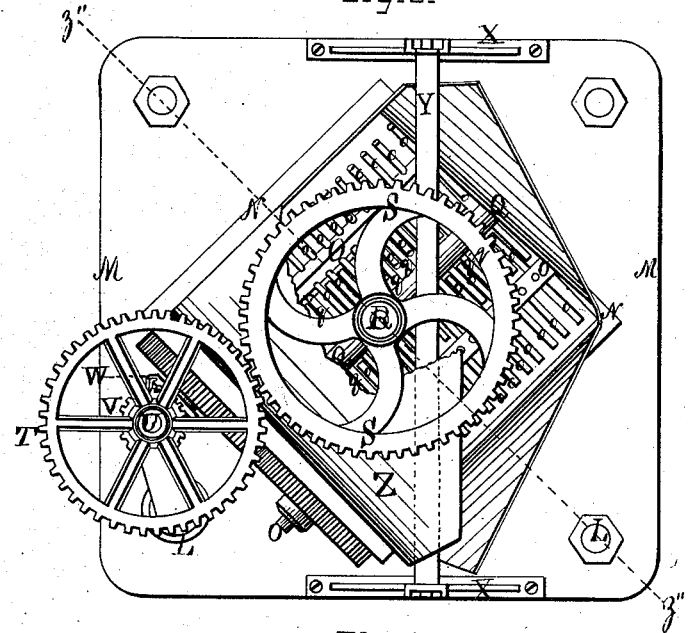
Figure 6:
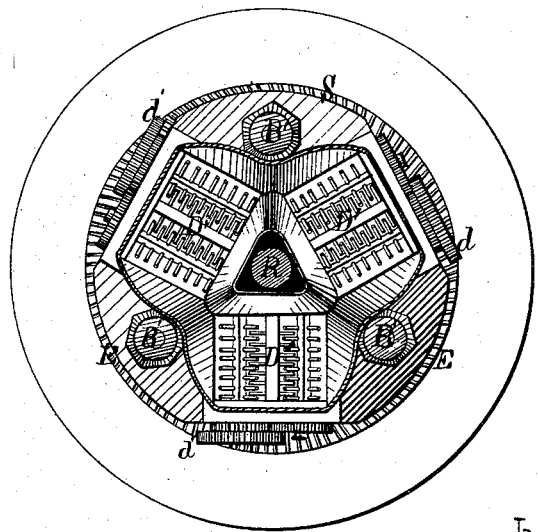
Figure 7:
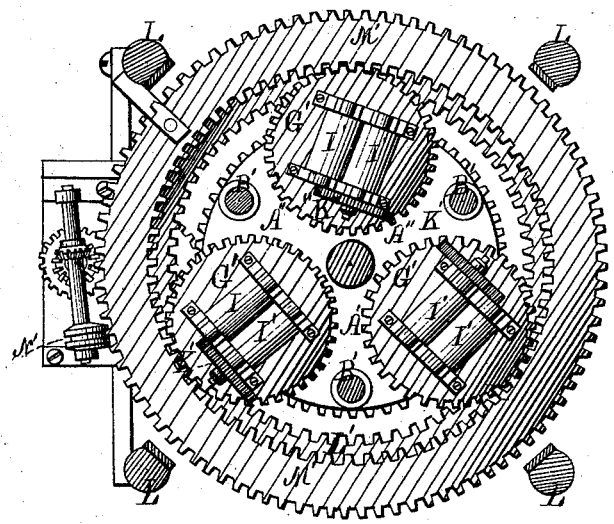
Figure 8:
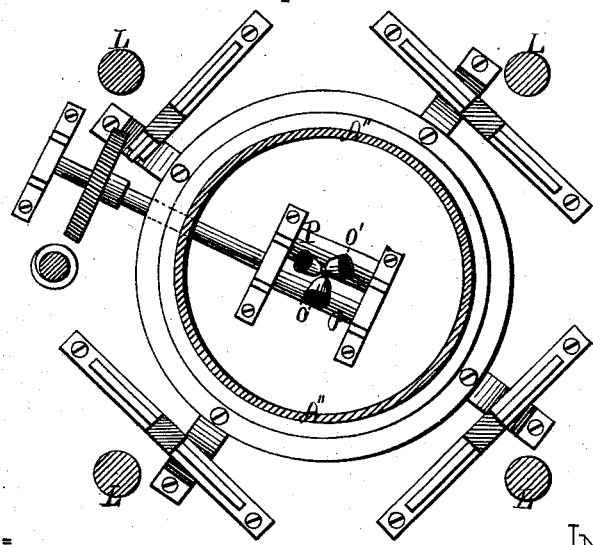

Figure 1 is a side elevation of the apparatus employed for preparing the hair for spinning. Fig. 2 is a plan view of the upper side of the same. Fig. 3 is a vertical central section upon line $x\ x$ of Fig. 2. Fig. 4 is a side elevation of my spinning mechanism. Fig. 5 is a plan view of the upper side of the same. Figs. 6, 7, and 8 are horizontal sections, upon lines $x'$, $z$, and $z'$, respectively, of Fig. 4. Fig. 9 is a vertical central section, upon line $z''\ z''$, of Fig. 5. Fig. 10 is an elevation of the lower portion of said mechanism, a portion of the casing being broken away so as to show the interior arrangement of parts. Fig. 11 is a perspective view of a drawing and twisting head detached from the machine. Fig. 12 is a like view of the parts composing said head separated from each other; and Figs. 13 and 14 are sections, upon lines $z'''\ z'''$ and $z''''$ and $z''''$, respectively, of Fig. 11.

Letters of like name and kind refer to like parts in each of the figures.

The design of my invention is to enable cow-hair and other similar substances to be spun into proper shape for weaving; and, to this end, it consists, principally, in the means employed for separating the hairs, and feeding equal quantities to each of the spinning-machines, substantially as and for the purpose hereinafter specified. It consists, further, in the mechanism employed for subdividing the hair, and feeding the same to the drawing and twisting heads, substantially as and for the purpose hereinafter shown. It consists, further, in the drawing and twisting heads, constructed and operated in the manner and for the purpose substantially as is hereinafter set forth.

In the annexed drawings, A represents a casing, which has a circular form horizontally, and vertically increases in size from its upper end downward to a point near its lower end, where it expands into a rectangular base, A', as shown. Within the casing A is journaled a vertical shaft, B, that is provided, at equidistant points between its journals, with radial arms $b$ and $b$, that extend nearly to the walls of said casing, and alternate with similar bars, $a$ and $a$, that are secured within the latter, and extend radially inward nearly to said shaft. The upper end of the casing A is inclosed, except where shaft B projects upward, and at one side, where a chute, C, is connected with, and extends horizontally outward from, said casing, and furnishes a means whereby the material to be operated upon may be fed into the machine. At the outer and inner ends of the bottom of the chute C are provided rollers $c$ and $c$, around which is placed an endless belt, D, that is caused to move inward at its upper side by means of grooved pulleys $c'$ and $c'$, that are attached to the projecting ends of said rollers, and are connected together, and to a suitable driving-pulley, E, by cords or belts $d$, said driving-pulley being connected, through suitable intermediate gearing, with the shaft B. At the lower end of the base A' are journaled a number of rollers, F and F, which are horizontal and parallel, and are separated by suitable spaces, as seen in Fig. 3. Upon the projecting end of each roller F is secured a worm-wheel, $f$, that meshes with, and receives motion from, a worm or screw, G, said screw being journaled upon the outer side of the base A', and caused to rotate by means of suitable intermediate mechanism that connects it with the shaft B. Within suitable ways immediately above the rollers F and F is placed a grid, H, which consists of a rectangular frame, provided with a series of cross-bars, $h$ and $h$, that are separated by parallel spaces $h'$ and $h'$, that have each a V shape transversely, and correspond, in number and in vertical position, to said rollers. A stud or pin, $b'$, that is secured upon one side and at the lower end of the shaft B, projects downward into one of the spaces $h'$ in the grid H, and, when said shaft is rotated, gives to said grid a reciprocating motion in a horizontal plane, and in a line having a right angle to the line of the rollers.

The machine thus constructed is placed at some distance above the spinning-machines, to be hereinafter described, and is connected with each of the latter by means of an endless belt, I, that passes around one of the rollers F, and around a similar roller attached to said machine, the inclination of said belt being such as to enable the material to be spun to be carried thereon to and into said machine.

The spinning mechanism is attached to and supported by a frame, which consists of a base, K, from which extend upward four posts or standards, L and L, that are connected together at their upper ends by means of a horizontal plate, M. Upon the upper side of the plate M is secured diagonally a rectangular frame, N, within which is journaled two horizontal shafts, O and O, that are each provided with several series of radial arms, $o$ and $o$, and are connected together by means of two engaging gear-wheels, which are attached to the projecting ends of said shafts. Between and parallel with the shafts O and O is placed a bar, Q, that is stationary, and is provided upon opposite sides with horizontally and radially projecting arms $q$ and $q$, which arms extend nearly to said shafts, and are placed midway between the arms $o$ and $o$.

Motion is imparted to the shafts or feeders O and O by means of a vertical shaft, R, that is journaled centrally within the machine, and is provided at its upper end with a gear-wheel, S, which meshes with a similar gear-wheel, T, that is attached to, and revolves with, a second shaft, U, said latter shaft being journaled within suitable bearings attached to the main frame, and having a bevel-pinion, V, that meshes with a similar pinion, W, that is secured upon the end of one of said shafts O. At opposite corners of the frame N are provided two standards, X and X, within which are journaled the roller Y, around which passes the endless belt or apron I, that conveys material from the picker, which material passes through a suitable opening in a sheet-metal housing, Z, that covers the feeders O O and $o$ $o$, and falls upon the latter. The lower end of the shaft R is secured within a hollow metal drum, A'', that rests within suitable bearings, and is capable of revolution in a horizontal plane, said drum being adapted externally to receive a belt for driving the machine. From the upper side of the drum A'' three standards, B', extend upward, and have attached to their upper ends a drum or casing, C', that has externally a general cylindrical form, with recesses $c''$ and $c''$ for the reception of said standards, and at its upper end fits over a dependent flange, $m$, that surrounds a centrally-located circular opening in the plate M. Within the lower portion of the upper drum C' are placed three or more feeders, D', (shown in Fig. 6,) that have the same general construction as that before described, (shown in Fig. 5,) are arranged radially, and are operated by means of a gear-wheel, $d'$, that is secured upon the projecting end of one shaft of each feeder, and meshes with a circular rack, E', which is suitably attached to the standards L and L, said drum and feeders being rotated around and with the shaft R, while said rack is stationary. Immediately below each feeder D' the drum or casing C' is extended downward in the form of a funnel-shaped chute, through which the material being operated upon passes to a drawing and twisting head, that is constructed as follows: Two gear-wheels, F' and G', are journaled upon the same bearing, H', that is secured to and extends upward from the upper face of the drum A'', and have each an independent motion. Upon the upper face of the upper gear-wheel G' are journaled two rollers, I' and I', which are covered, preferably, with an elastic material, and have their peripheries nearly or quite in contact.

Upon the projecting end of one roller, I', is secured a spur-gear wheel, K', that has such dimensions as to enable it to mesh with a toothed ring, $f'$, that is formed upon the upper face of the lower gear-wheel F', a suitable slot, $g'$, being provided within the upper gear-wheel G' for the passage of said gear K'. Upon a line, horizontally, with the gear-wheels F' and G' are placed two externally and internally toothed rings, L' and M', respectively, which rings engage interiorly with said gears, and are journaled within suitable bearings, so as to have each an independent rotary motion. The lower toothed ring L' is moved in the direction of the shaft R and driving pulley or drum A'' by a worm, N', that engages with the toothed periphery of said ring, and, by means of suitable intermediate gearing, is connected with a toothed rim, $a''$, that is provided upon the periphery at the upper end of said drum. The upper toothed ring is, in a like manner, driven forward or backward, or is held stationary, as may be required. As thus arranged, the motion of the drum A'' causes the drawing and twisting heads to rotate around its axis, the upper ring M' causes each head to rotate around its own center, while the lower ring, operating through the lower gear-wheel F' and spur-gear K', causes the feed-rollers I' and I' to rotate inward and downward, the relative motion of said rollers and of the twisting-head around its own center being varied by the relative motion of the toothed rings. The bearing H' of each twisting-head is hollow, and, at its lower end, opens into the upper end of a chute, O', that extends downward and toward the center, as shown in Fig. 9, where it terminates immediately over the center of a pair of elastic rollers, P' and P', that are connected, through suitable gearing, with the driving-drum A'', and have an inward and downward motion.

The device is now complete, and operates as follows: The material to be spun, preferably cow-hair, having been suitably colored, is passed through the picker, where the hairs become thoroughly separated; after which said material is conveyed to and deposited upon the feeders at the upper end of the spinning-machine. The feeders pass the cow-hair downward into the upper drum, where it is divided into three equal portions, and, by means of the lower feeders, is passed downward to the drawing and twisting heads, which latter twist said hair and draw it downward with such speed as may be desired. The more rapid the motion of the rollers with relation to the motion of said head, the less said hair will be twisted, while a decreased relative motion of said rollers will result in a harder twist of said hair. From the revolving, twisting, and drawing heads the threads pass downward to the stationary head, where they are united and twisted into one thread, and from thence pass to the winding mechanism in a condition to be woven.

Having thus fully set forth the nature and merits of my invention, what I claim as new is—

1. The casing A and A', provided with the radial bars $a$ and $a$, the shaft B, $b$, and $b$, journaled vertically within said casing, the grid H, $h$, and $h$, caused to reciprocate by means of the eccentric stud $b'$, and the rollers F, which carry the feed-belts I and I, said parts being constructed and combined to operate in the manner and for the purpose substantially as specified.

2. The feeder-shafts O $o$, casing C' $c''$, and feeders D', constructed as shown, and relatively arranged and operated in the manner and for the purpose substantially as set forth.

3. The drawing and twisting heads, consisting of the gear-wheels F', $f'$, G', and $g'$, journaled upon the bearing H', the feed-rollers I' and I', and the gear-wheels K', said parts being combined with each other, the drum A'', and the toothed rings L' and M', having relatively different motions in a horizontal plane, substantially as and for the purpose shown and described.

In testimony that I claim the foregoing I have hereunto set my hand this 13th day of May, 1874.

CHARLES PFANNE.

Witnesses:
GEORGE S. PRINDLE,
JOHN R. YOUNG.